United States Patent
Beger et al.

(12)

(10) Patent No.: US 6,911,645 B2
(45) Date of Patent: Jun. 28, 2005

(54) DWDM CHANNEL DETECTION SYSTEM

(75) Inventors: Alexander Beger, Bridgewater, NJ (US); Ranjan Dutta, Lawrenceville, NJ (US); Mitchell E. Haller, Marlboro, NJ (US); Shuai Shen, East Brunswick, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 292 days.

(21) Appl. No.: 10/383,911

(22) Filed: Mar. 7, 2003

(65) Prior Publication Data

US 2004/0173731 A1 Sep. 9, 2004

(51) Int. Cl.[7] .................................................. G01J 4/00

(52) U.S. Cl. ............................. 250/227.19; 250/214 R (58) Field of Search ..................... 250/227.19, 227.21, 250/227.22, 216, 214 R, 226, 237 G; 356/450, 451, 456

(56) References Cited

U.S. PATENT DOCUMENTS 5,319,438 A * 6/1994 Kiasaleh ..................... 398/203

* cited by examiner

Primary Examiner—Que T. Le (57) ABSTRACT

A channel detection system includes an interferometer coupled to a spectrum analyzer to differentiate additive spontaneous emission (ASE) noise from optical channels in a dense wave-division multiplex (DWDM) signal. It is assumed that channels, if present, are centered at frequencies corresponding to a standardized channel grid. The relative delay of the interferometer is chosen to be greater than the coherence time of the ASE noise but less than the coherence time of the channels with the interferometer's free spectral range set to an integer divisor of the channel-to-channel frequency spacing of the grid such that active channels experience a high degree of interference. The phase delay of the interferometer is then adjusted to maximize the interference at each grid-aligned frequency. The spectrum-analyzed outputs are compared (e.g., subtracted from one another and then thresholded) to determine the channels present in the DWDM signal.

12 Claims, 6 Drawing Sheets

DWDM CHANNEL DETECTION SYSTEM

BACKGROUND OF THE INVENTION

1. Field of the Invention

The present invention relates to optical communication, and, more specifically, to optical channel monitors in dense wave-division multiplexing systems.

2. Description of the Related Art

Historically, the fibers in optical communications systems were illuminated with light consisting of one, or at most a handful, of wavelengths. With the widespread adoption of dense wave-division multiplexing (DWDM) technology, it is now common to light fibers with tens or even hundreds of different wavelengths simultaneously, each wavelength representing a different channel within the system. As the number of wavelengths and the general complexity of these systems have increased, correspondingly higher demands have been placed on the optical performance monitoring systems that are used to manage bandwidth, power, amplification, attenuation, and dynamic filtering within these systems. These optical performance monitoring systems and the system attributes they control are essential for robust operation of the network. They are also key elements of fault reporting, analysis, and management subsystems.

Figure 1:
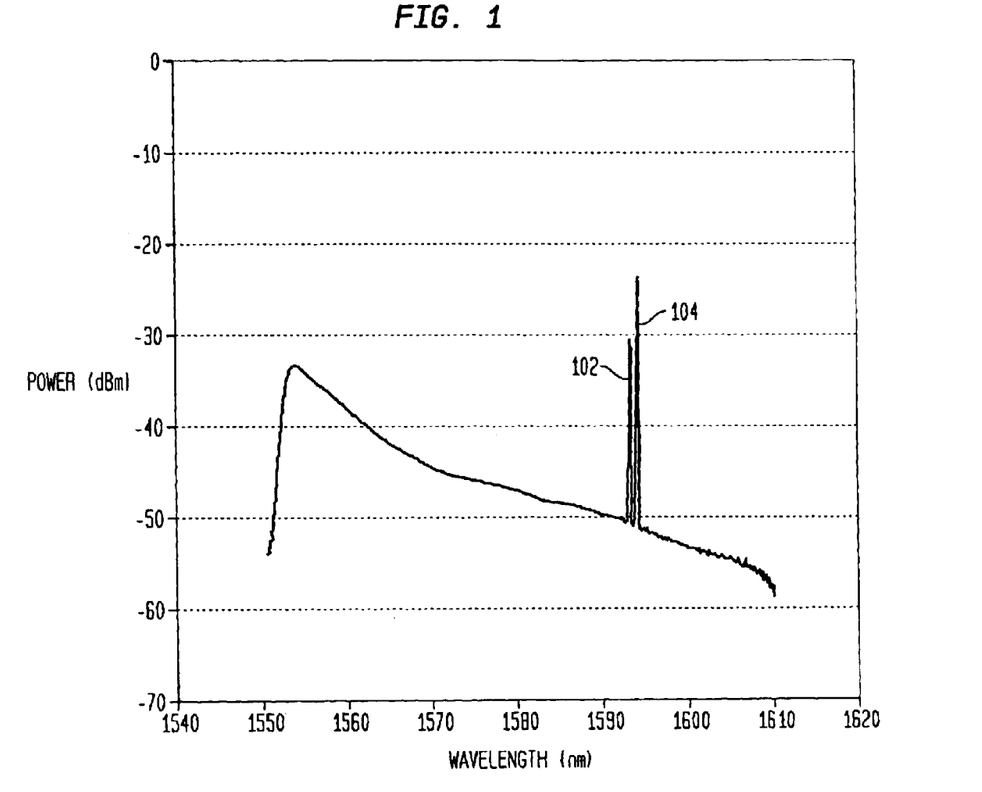
FIG. 1 depicts power (dBm) versus wavelength (nm) for a DWDM signal composed of two channels superimposed on an ASE noise background.

One of the primary functions of optical monitors in optical communications systems today is the detection of the channels that are present in the various optical links of these systems. The conventional approach to channel detection used by these optical monitors is based on certain assumptions about the optical spectrum of a DWDM signal. A typical DWDM signal spectrum consists of sharp peaks located at the centers of the channel wavelengths superimposed on a smooth background of additive spontaneous emission (ASE) noise. This is illustrated by FIG. 1, which depicts power (dBm) versus wavelength (nm) for a DWDM signal composed of two channels 102 and 104 superimposed on an ASE noise background. Note that the peaks of the spectrum 102 and 104 correspond to the channels in the signal at typical International Telecommunications Union (ITU) standard 100-GHz grid channel-to-channel spacing in the vicinity of 1593 nm. Under these conditions, channels can be detected by finding the peaks in the spectrum. This approach works even in the presence of relatively strong ASE noise.

Figure 2:
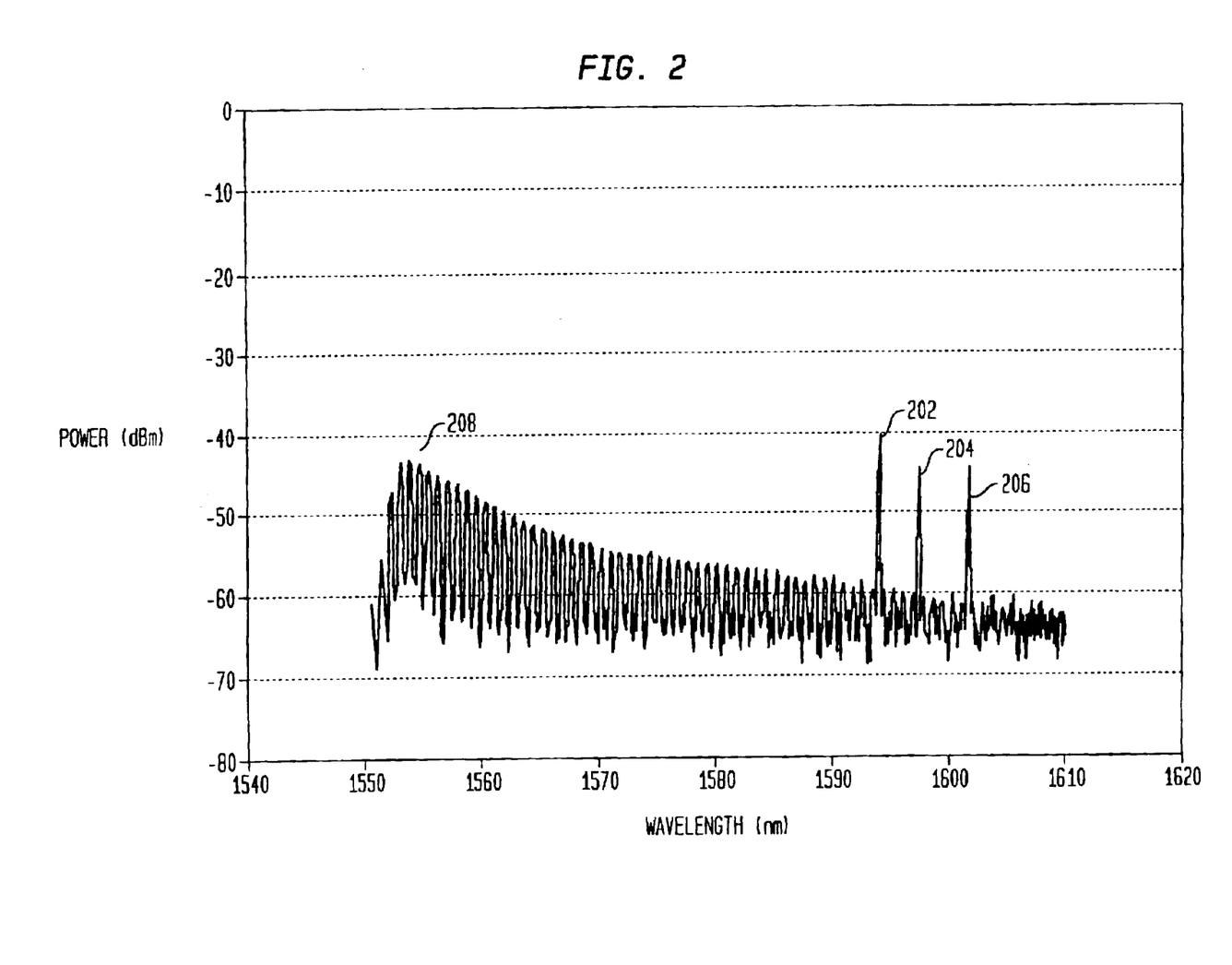
FIG. 2 depicts power (dBm) versus wavelength (nm) for a DWDM signal that has passed through various filtering components.

However, modern DWDM systems include additional components, notably optical add-drop multiplexers (OADMs), wavelength interleavers, and active optical switching and multiplexing components, which generally employ sharp wavelength filtering to accomplish their various functions. As DWDM signals pass through these components, the components' filtering functions are impressed on the smooth ASE noise background of the signals, resulting in sharp spectral features centered on and about the ITU channel locations. This is illustrated by FIG. 2, which depicts power (dBm) versus wavelength (nm) for a DWDM signal that has passed through various filtering components. This signal includes three channels 202, 204, and 206 superimposed on an ASE noise background. Note that the peaks of the spectrum corresponding to channels 202, 204, and 206 are not significantly higher, in some cases, than the peaks of the filtered ASE noise. In particular, in FIG. 2, some of the noise peaks 208 corresponding to the shorter wavelengths have more power than some of the channel peaks. Under these conditions, the peak-finding approach to channel detection is often inadequate. With increasing modulation rate and filter cascading, the width of the peak is not a clear indicator of the presence of a channel. Although it is still possible to distinguish the channel peaks from the interleaved ASE peaks given sufficient spectral resolution in the spectrometer within an optical monitor, such spectrometers are relatively expensive and have slower scan speeds than peak detection devices.

SUMMARY OF THE INVENTION

To address the above-discussed deficiencies of the prior art, one embodiment of this invention is a dense wave-division multiplexing (DWDM) channel detection system that includes an interferometer (e.g., Mach-Zehnder) coupled to a spectrum analyzer to differentiate interleaved additive spontaneous emission (ASE) noise from optical channels in a DWDM signal. The DWDM signal is assumed to include one or more channels, wherein the channels, if present, are centered at frequencies that are a fixed frequency offset from each other corresponding to a standardized channel grid (e.g., an ITU 100-GHz grid). The relative delay of the two paths within the interferometer is preferably chosen to be greater than the coherence time of the ASE noise but less than the coherence time of the channels. The relative delay is preferably further restricted such that the free spectral range (FSR) of the interferometer is an integer divisor of the channel-to-channel frequency spacing within the channel grid and consequently any channels present that conform to this grid experience a high degree of constructive interference.

In operation, the output of the interferometer is applied to an optical spectrum analyzer and a measurement is made of the power at each frequency of the grid. The phase delay of the interferometer may then be adjusted to maximize the destructive interference at each frequency aligned to the grid and a measurement may again be made of the power at each frequency of the grid. The difference between the constructive and destructive measurements is then calculated at each frequency on the grid and compared to a threshold to determine the presence or absence of channels in the DWDM signal.

In another implementation, two output port from a dual-output interferometer are used, one preset for maximum constructive interference and one preset for maximum destructive interference of frequencies aligned to the grid. Simultaneous measurements are made with both output ports of the power at each frequency of the grid and the difference at each frequency calculated and compared to a threshold, as before, to determine the presence or absence of channels.

In one embodiment, the invention is an optical channel detector, comprising (a) an interferometer connected to receive an input optical signal having one or more optical channel signals and generate one or more output optical signals, wherein each output optical signals corresponds to a sum of the input optical signal and a delayed version of the input optical signal; (b) at least one spectrum analyzer connected to receive at least one output optical signal from the interferometer and generate data signals corresponding to the power of the at least one output optical signal at a plurality of different grid frequencies; and (c) a control processor connected to receive the data signals from the at least one spectrum analyzer and generate a control signal to control the delay applied by the interferometer, wherein the control processor is adapted to control the delay applied by the interferometer at one or more different settings corresponding to different degrees of constructive/destructive interference of the one or more optical channel signals at the different grid frequencies; and the control processor is adapted to compare the data signals generated by the at least one spectrum analyzer for one or more different delay settings to determine whether an optical channel signal is present in the input optical signal at each grid frequency.

In another embodiment, the invention is a method for detecting optical channels. The method involves generating one or more output optical signals from an input optical signal, wherein each output optical signals corresponds to a sum of the input optical signal and a delayed version of the input optical signal. It also involves generating data signals corresponding to the power of the at least one output optical signal at a plurality of different grid frequencies. Additionally, it involves controlling the delay applied in generating the one or more output optical signals at one or more different settings corresponding to different degrees of constructive/destructive interference of the one or more optical channel signals at the different grid frequencies; and comparing the data signals generated for one or more different delay settings to determine whether an optical channel signal is present in the input optical signal at each grid frequency.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

DWDM System

Figure 3:
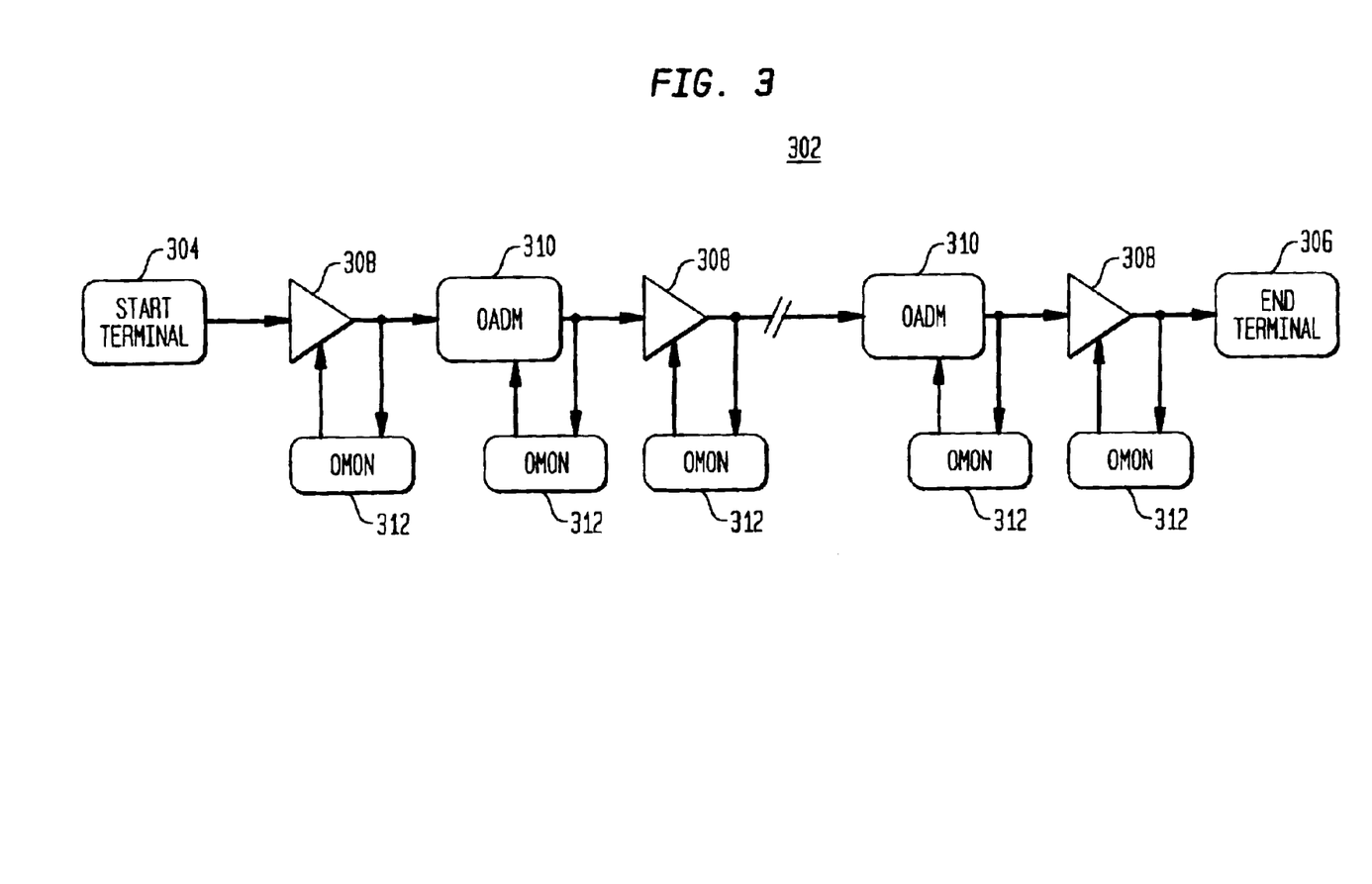
FIG. 3 is a block diagram of a dense wave-division multiplexing (DWDM) optical communications system according to one embodiment of this invention.

FIG. 3 is a block diagram of a dense wave-division multiplexing (DWDM) optical communications system 302 according to one embodiment of this invention. System 302 includes start terminal 304, end terminal 306, intervening repeaters 308, and optical add-drop multiplexers (OADMs) 310 interconnected by fiber optic links. System 302 also includes optical monitors (OMONs) 312, each of which monitors the output of a repeater or OADM by tapping a small amount of power from its fiber optic output. Each OMON 312 also provides status and control to its associated repeater or OADM and to centralized management devices (not shown in FIG. 3) via simple network management protocol (SNMP) or an equivalent mechanism. Start terminal 304 and end terminal 306 typically include optical translation units (OTUs), multiplexers and demultiplexers with integral interleavers, and optical amplifiers (OAs). Each repeater typically includes OAs and one or more dispersion compensation modules (DCMs). Each OADM typically includes interleavers for multiplexing and demultiplexing of channels into and out of the fiber links and OAs and dispersion compensation modules (DCMs) for correcting optical dispersion introduced into the fiber paths. Each OMON includes circuitry for detecting the channels present in the optical fiber link it monitors and for adjusting the operational parameters of its associated repeater or OADM accordingly.

In the system illustrated by FIG. 3, as a DWDM signal passes through the various filtering and interleaving devices (e.g., OADMs, multiplexers, and demultiplexers), the relatively smooth additive spontaneous emission (ASE) noise from the OAs is shaped into spikes at various frequencies, including those frequencies corresponding to standardized channel grids (e.g., the ITU 100-GHz grid). An exemplary signal spectrum, as discussed previously, is illustrated by FIG. 2, where peaks corresponding to some of the actual channels 202, 204, and 206 are shown to be no higher than peaks (208) corresponding to some of the filtered ASE noise spikes. Because of this, those noise peaks that align to the standardized channel grid might be misinterpreted as representing active channels at the corresponding frequencies of the grid.

Channel Detector

Figure 4:
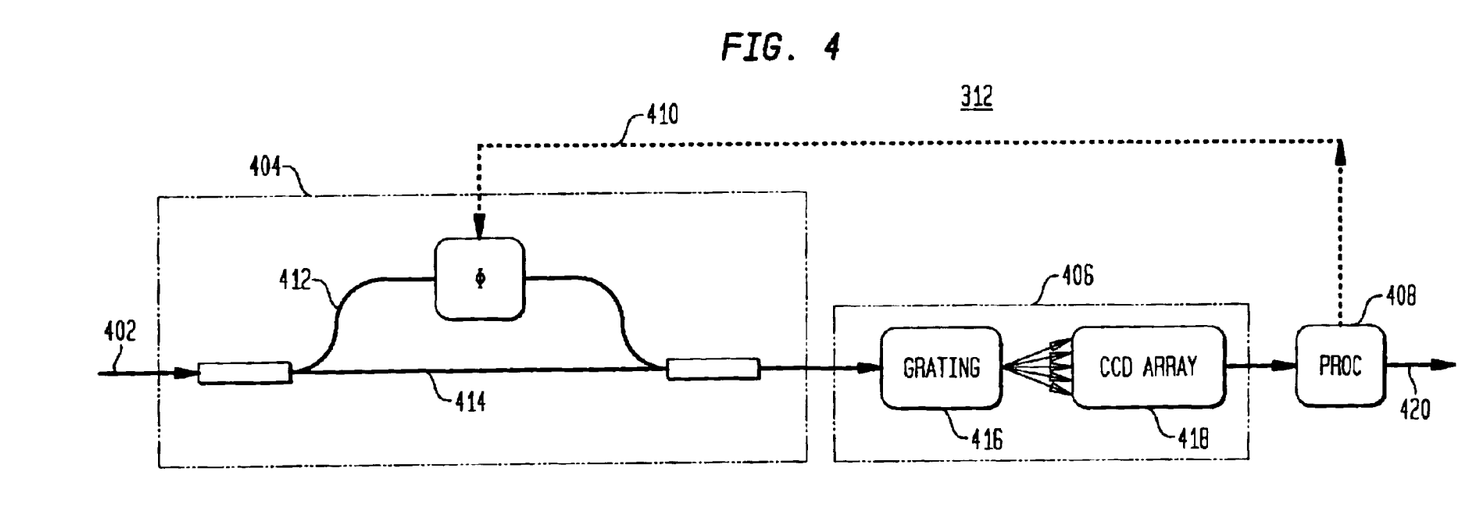
FIG. 4 is a block diagram depicting one implementation of the channel-detecting portion of each optical monitor of FIG. 3.

FIG. 4 is a block diagram depicting one implementation of the channel-detecting portion of each OMON 312 of FIG. 3. In particular, FIG. 4 shows interferometer 404, spectrum analyzer 406, and control processor 408.

DWDM signal 402 is first input to optical interferometer 404. Interferometer 404 may be of any suitable type including, for example, Mach-Zehnder or Michelson. A preferred embodiment utilizes a Mach-Zehnder interferometer. The interferometer splits the signal into two paths 412 and 414, delays one path (412) with respect to the other path (414), recombines the two paths, and outputs the result to spectrum analyzer 406.

Spectrum analyzer 406 may also be implemented in various ways. These implementations might involve spectral separating or filtering devices followed by multiple banks of power detectors, potentially all in the optical domain. FIG. 4 illustrates a preferred implementation. Here, within spectrum analyzer 406, the output of interferometer 404 is split into separate spectral components via optical (e.g., fiber Bragg or bulk optics) grating 416 (alternatively, a prism could be used) and the result used to illuminate CCD array 418. The array is read out under the control of control processor 408 yielding data (420) representing essentially the relative power vs. wavelength characteristics of the signal that was output from interferometer 404. Control processor 408 controls the relative phase (i.e., delay) of interferometer 404 via control interface 410. In operation, control processor 408 alternates the relative delay of interferometer 404 between two settings.

In the first setting, the relative delay of interferometer 404 is chosen such that each component of signal 402 with a frequency corresponding to a regular channel grid (e.g., the ITU standard 100-GHz grid) will substantially constructively interfere with itself. In the second setting, the relative delay of the interferometer is chosen so that each component of signal 402 with a frequency corresponding to a regular channel grid will substantially destructively interfere with itself. The signals output from interferometer 404 at the first setting are processed by spectrum analyzer 406 to obtain a first power estimate at each grid frequency. The signals output from interferometer 404 at the second setting are also processed by spectrum analyzer 406 to obtain a second power estimate at each grid frequency. A difference is then computed in control processor 408 at each grid frequency between the two different estimates, and each difference is thresholded to determine the presence or absence of channels at those frequencies. This procedure is captured by the flow diagram of FIG. 5.

Single Output Interferometer Control Procedure

Figure 5:
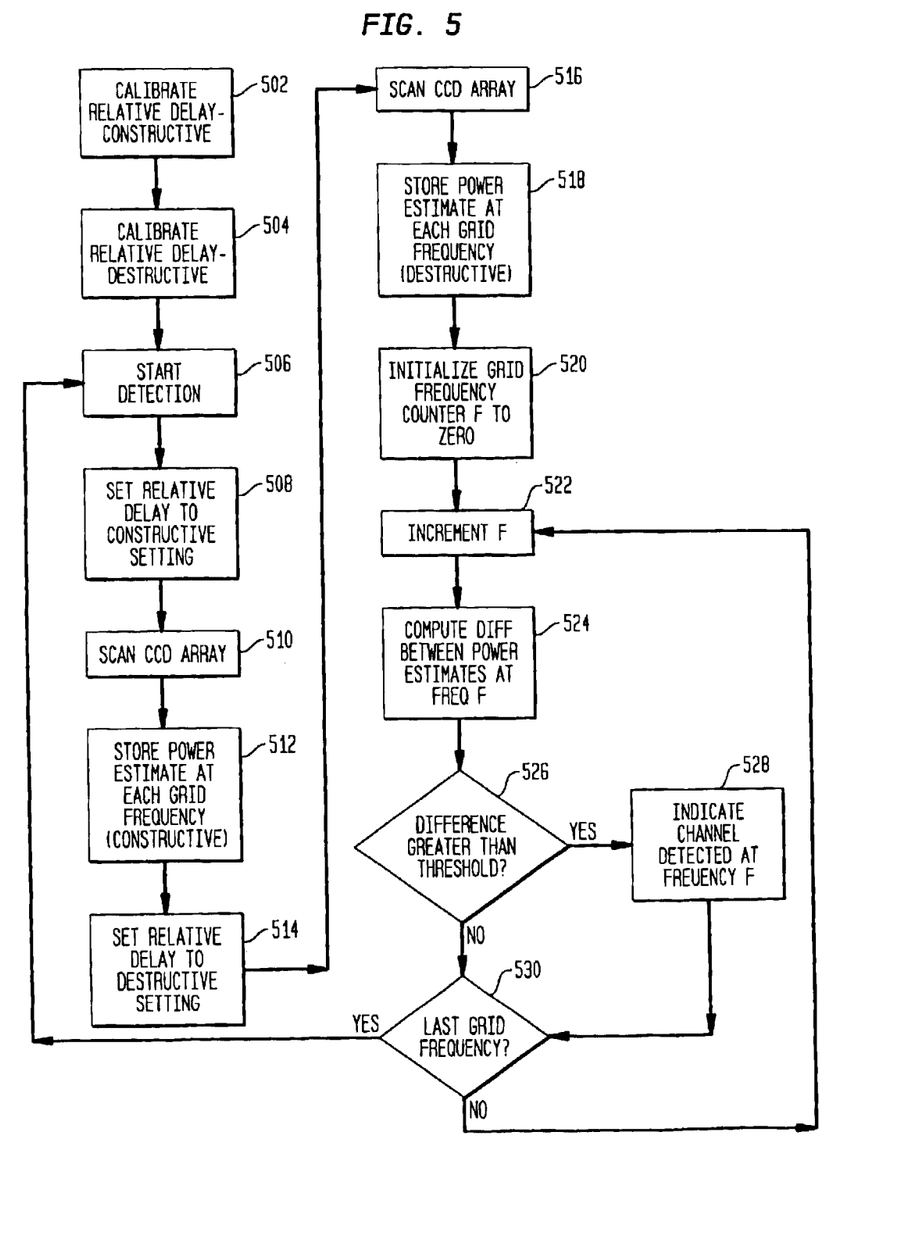
FIG. 5 is a flowchart of the operation of the channel-detecting portion of each optical monitor of FIG. 3 for the implementation of FIG. 4.

In step 502 of FIG. 5, interferometer 404 of FIG. 4 is calibrated to determine the control voltage from control processor 408 to the interferometer via interface 410 that results in constructive interference at grid frequencies. This calibration might be done in the factory or in the initial configuration, or might possibly be integrated into the run-time operation of the system. If a run-time calibration is performed, it might be run at some externally configured interval and might make use of a priori knowledge of known channels within the system. In step 504, a similar calibration is done to determine the correct control voltage that results in destructive interference at the grid frequencies. This may alternatively be derived given the prior voltage setting, knowledge of the interferometer characteristics, and the grid frequency spacing.

Once calibration is complete, the steady state operation of the channel detector of FIG. 4 commences in step 506 with the setting of interferometer 404 in step 508 to achieve constructive interference at the grid frequencies. In step 510, control processor 408 scans CCD array 418 and adjusts the resulting data to produce estimates of the power content of the signal out of the interferometer at each grid frequency. In step 512, these "constructive" estimates are stored.

In step 514, the interferometer is set to achieve destructive interference at the grid frequencies. In step 516, the control processor again scans the CCD array and adjusts the data to produce estimates of the power content of the signal out of the interferometer at each grid frequency. In step 518, these "destructive" estimates are stored.

After power estimates at each grid frequency for both constructive and destructive settings of the interferometer are stored, the differences are calculated and thresholded by control processor 408 for channel detection. This process starts in step 520 where grid frequency counter F is initialized to zero. In step 522, the counter is incremented to "one" to reference the constructive and destructive power estimates stored previously for the first grid frequency. Next, in step 524, these stored values are retrieved and their difference is computed. In step 526, this difference is compared to a threshold. If the difference is greater than the threshold, in step 528, indication is provided by the control processor to the rest of the system that an active channel was found at that frequency. This can be done via a serial output from the control processor, an interrupt to an external microprocessor, a communication protocol (e.g., simple network management protocol (SNMP)), or other suitable means. In either case, in step 530, the frequency counter is compared to a terminal grid frequency count to see if all the grid frequency values have been considered. If not, control returns to step 522 where the frequency counter is again incremented to process data for the next grid frequency. Steps 522 through 530 are repeated until all the grid frequency differences have been computed, thresholded, and active channel indications sent. After the last frequency has been considered, as determined in step 530, control returns to step 506 where detection begins anew, potentially after some inter-detection delay.

Referring back to FIG. 4 and the related discussion, if the relative delay of the interferometer is set to 10 ps by control processor 408, then the free spectral range (FSR) of the interferometer will be 100 GHz and the components of signal 402 that are aligned to a standard ITU 100-GHz grid will all experience constructive interference. Likewise, each component of signal 402 with a frequency corresponding to a regular channel grid of 200 GHz will also experience constructive interference, and more generally, each component of signal 402 with a frequency corresponding to a regular channel grid of N×100 GHz (where N is a positive integer) will also experience constructive interference.

Similarly, if the relative delay of the interferometer were set to 20 ps by control processor 408, then the FSR of the interferometer would be 50 GHz and still the components of signal 402 that are aligned to a standard ITU 100-GHz grid will experience substantial constructive interference (as would those components that are aligned to a 50-GHz grid). More generally, if the relative delay of the interferometer is set to N×10 ps, each component of signal 402 that is aligned to the ITU standard 100-GHz grid will experience constructive interference (as will those components aligned to 100/N-GHz grids). This will result in relative peaks in the spectrum of the output of the interferometer corresponding to frequencies substantially aligned with the grid.

These peaks corresponding to constructive interference will occur when the components of signal 402 at the various frequencies are coherent (i.e., are phase continuous) relative to the relative delay of the interferometer (i.e., relative to the free spectral range of the interferometer). This is typically the case for active channels within optical communication systems since such channels rarely exhibit coherence times less than the symbol interval of the modulating carrier, and generally the coherence time for a CW laser (not data modulated) is much longer. Noise (e.g., additive spontaneous emission (ASE) noise), however, is generally uncorrelated and therefore exhibits a much shorter coherence time than active channels do. The result of this is that, as long as the relative delay of the interferometer is longer than the coherence time of the noise, the noise spectrum will be substantially unchanged by the interferometer, while components of input signal 402 corresponding to the channel grid will be emphasized.

Note that the second setting of the interferometer results in exactly the opposite effect. In other words, when the relative delay of interferometer 404 is changed to the second setting by control processor 408, each component of signal 402 with a frequency that is aligned to the channel grid will substantially destructively interfere with itself, rather than substantially constructively interfering with itself.

By alternating the relative delay of the interferometer between (1) a first relative delay that yields constructive interference of coherent, grid-aligned components of signal 402 and (2) a second relative delay that yields destructive interference of coherent, grid-aligned components of signal 402, control processor 408 is able to create (using interferometer 404 and spectrum analyzer 406) two signals whose difference, taken at each grid frequency has a spectrum that exhibits (i) peaks corresponding to the active channels that are substantially aligned with the channel grid and (ii) nulls where the input signal 402 has substantial, though, non-coherent (i.e., noise-related) power at grid-aligned wavelengths. By comparing these peaks with a predetermined or AGC-controlled or normalized threshold, control processor 408 is able to compute, with a high degree of certainty, the grid frequencies that contain active channels.

Dual-Output Interferometer Version

Figure 6:
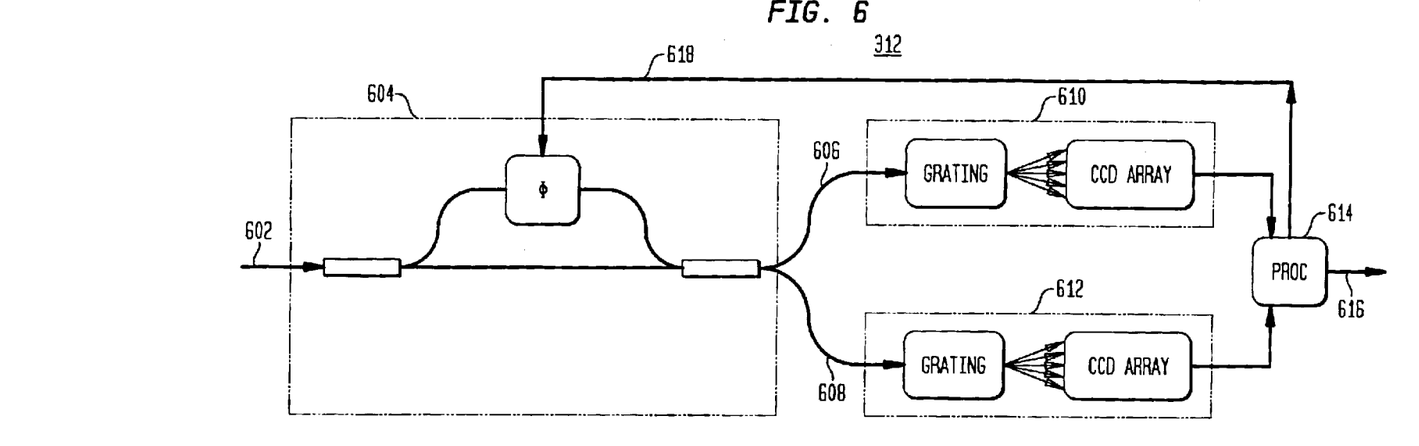
FIG. 6 is a block diagram depicting an alternative implementation of the channel-detecting portion of each optical monitor of FIG. 3.

FIG. 6 depicts an alternative implementation of the channel-detecting portion of each OMON 312 of FIG. 3. This device is similar to the device of FIG. 4, except that, instead of using a single-output interferometer to drive a single spectrum analyzer and alternating between 0- and 180-degree phase shifts to achieve constructive and destructive interference at the channel grid-aligned frequencies, the device in FIG. 6 utilizes dual-output interferometer 604 and feeds each output to a different spectrum analyzer. Interferometer 604 is either calibrated in advance or controlled dynamically by control processor 614 via control interface 618. This calibration or control of the relative delay of the interferometer is such that coherent, grid-aligned components of signal 602 constructively interfere at upper output 606 of the interferometer, in a manner similar to the operation of the single output of interferometer 404 of FIG. 4. Additionally, the design of interferometer 604 is such that, at the same control setting, coherent, grid-aligned components of signal 602 destructively interfere at lower output 608. The outputs of both upper (610) and lower (612) spectrum analyzers are processed by control processor 614 to produce the difference of the power detected at each frequency (616). As before, the differences at the noise frequencies will be relatively small, while the differences at frequencies corresponding to active channels will be relatively large. Note that this design, which is based on a dual-output interferometer, eliminates the need to alternate the interferometer between constructive and destructive phases, but at the cost of duplicating the spectrum analyzer hardware.

Figure 7:
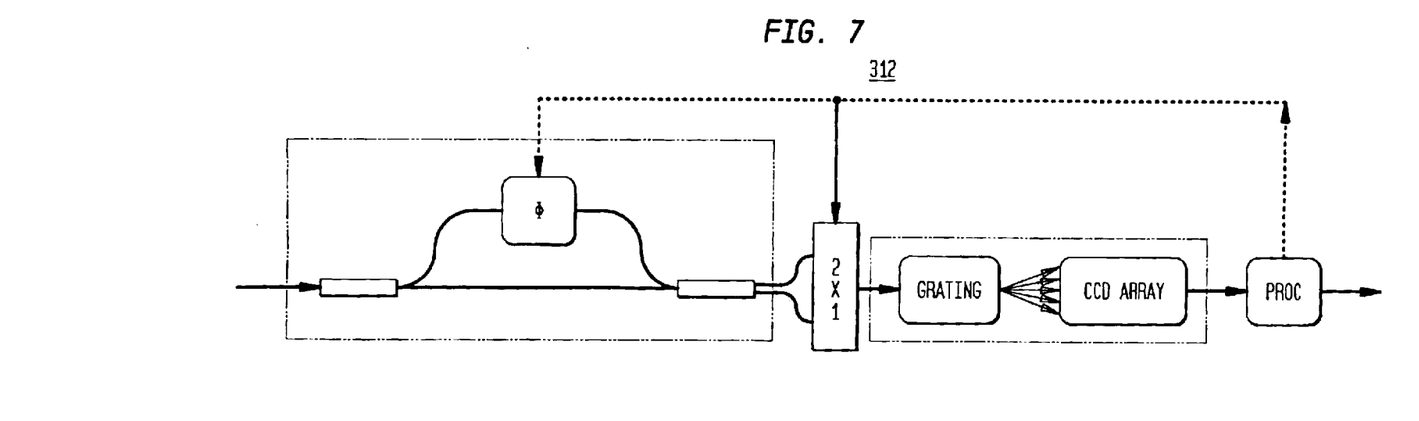
FIG. 7 is a block diagram depicting yet another alternative implementation of the channel-detecting portion of each optical monitor of FIG. 3.

As stated before, many different implementations for both interferometer and spectrum analyzer are possible. FIG. 6 depicts Mach-Zehnder type dual-output interferometer 604 followed by two grid/CCD-array type spectrum analyzers 610 and 612, though other implementations are possible, as would be understood to one skilled in the art. For example, instead of duplicating the spectrum analyzers, a 2×1 optical switch could be fashioned between the dual-output Mach-Zehnder and a single spectrum analyzer, as depicted in FIG. 7.

Alternatively, each output of a dual-output Mach-Zehnder device could feed a different grid. These two grids could be controlled to alternately illuminate a single CCD-array in ping-pong fashion. The data read from the array after illumination by output of the first grid (e.g., data corresponding to constructive interference at grid-aligned frequencies) could be subtracted from the data read from the array after it has been illuminated by the output of the second grid (e.g., data corresponding to destructive interference at grid-aligned frequencies) to form the difference signal that is thresholded at each grid frequency to determine the active channels in the fiber link.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

One or more elements of the present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. An optical channel detector, comprising:
   (a) an interferometer connected to receive an input optical signal having one or more optical channel signals and generate one or more output optical signals, wherein each output optical signals corresponds to a sum of the input optical signal and a delayed version of the input optical signal;
   (b) at least one spectrum analyzer connected to receive at least one output optical signal from the interferometer and generate data signals corresponding to the power of the at least one output optical signal at a plurality of different grid frequencies; and
   (c) a control processor connected to receive the data signals from the at least one spectrum analyzer and generate a control signal to control the delay applied by the interferometer, wherein:
   the control processor is adapted to control the delay applied by the interferometer at one or more different settings corresponding to different degrees of constructive/destructive interference of the one or more optical channel signals at the different grid frequencies; and
   the control processor is adapted to compare the data signals generated by the at least one spectrum analyzer for one or more different delay settings to determine whether an optical channel signal is present in the input optical signal at each grid frequency.

2. The invention of claim 1, wherein the interferometer is a Mach-Zehnder interferometer.

3. The invention of claim 1, wherein the at least one spectrum analyzer comprises:
   (1) an optical grating connected to split the at least one output optical signal from the interferometer into separate spectral components corresponding to the different grid frequencies; and
   (2) a CCD array connected to receive the spectral components and generate a data signal for each spectral component corresponding to the power of the spectral component.

4. The invention of claim 1, wherein the channel detector has a single spectrum analyzer.

5. The invention of claim 1, wherein:
   the interferometer simultaneously generates first and second output optical signals;

the channel detector comprises first and second spectrum analyzers;

the first spectrum analyzer is connected to receive the first output optical signal from the interferometer and provide a first set of data signals to the control processor;

the second spectrum analyzer is connected to receive the second output optical signal from the interferometer and provide a second set of data signals to the control processor; and the control processor is adapted to process the first and second sets of data signals to determine whether an optical channel signal is present at each grid frequency.

6. The invention of claim 5, wherein the first and second output optical signals are complementary to each other and the first and second spectrum analyzers operate simultaneously to generate the first and second sets of data signals used by the control processor.

7. The invention of claim 1, wherein:

the interferometer simultaneously generates first and second output optical signals;

the channel detector further comprises an optical switch connected between the two outputs from the interferometer and the at least one spectrum analyzer;

the control processor is adapted to control the optical switch to alternately select one of the first and second output optical signals from the interferometer to be applied to the at least one spectrum analyzer, such that first and second sets of data signals are generated by the at least one spectrum analyzer in a ping-pong manner for use by the control processor in determining whether an optical channel signal is present at each grid frequency.

8. A method for detecting optical channels, comprising:

generating one or more output optical signals from an input optical signal, wherein each output optical signals corresponds to a sum of the input optical signal and a delayed version of the input optical signal;

generating data signals corresponding to the power of the at least one output optical signal at a plurality of different grid frequencies;

controlling the delay applied in generating the one or more output optical signals at one or more different settings corresponding to different degrees of constructive/destructive interference of the one or more optical channel signals at the different grid frequencies; and comparing the data signals generated for one or more different delay settings to determine whether an optical channel signal is present in the input optical signal at each grid frequency.

9. The invention of claim 8, wherein generating the data signals comprises:

splitting the at least one output optical signal into separate spectral components corresponding to the different grid frequencies; and generating a data signal for each spectral component corresponding to the power of the spectral component.

10. The invention of claim 8, wherein:

first and second output optical signals are simultaneously generated from the input optical signal;

a first set of data signals is generated from the first output optical signal;

a second set of data signals is generated from the second output optical signal; and the first and second sets of data signals are processed to determine whether an optical channel signal is present at each grid frequency.

11. The invention of claim 10, wherein the first and second output optical signals are complementary to each other and the first and second sets of data signals are generated simultaneously.

12. The invention of claim 8, wherein:

first and second output optical signals are simultaneously generated from the input optical signal; and one of the first and second output optical signals is alternately selected to generate first and second sets of data signals in a ping-pong manner for use in determining whether an optical channel signal is present at each grid frequency.

* * * * *